(No Model.)  2 Sheets—Sheet 1.
T. SMITH & E. P. WHITE.
SNOW PLOW.
No. 591,432. Patented Oct. 12, 1897.
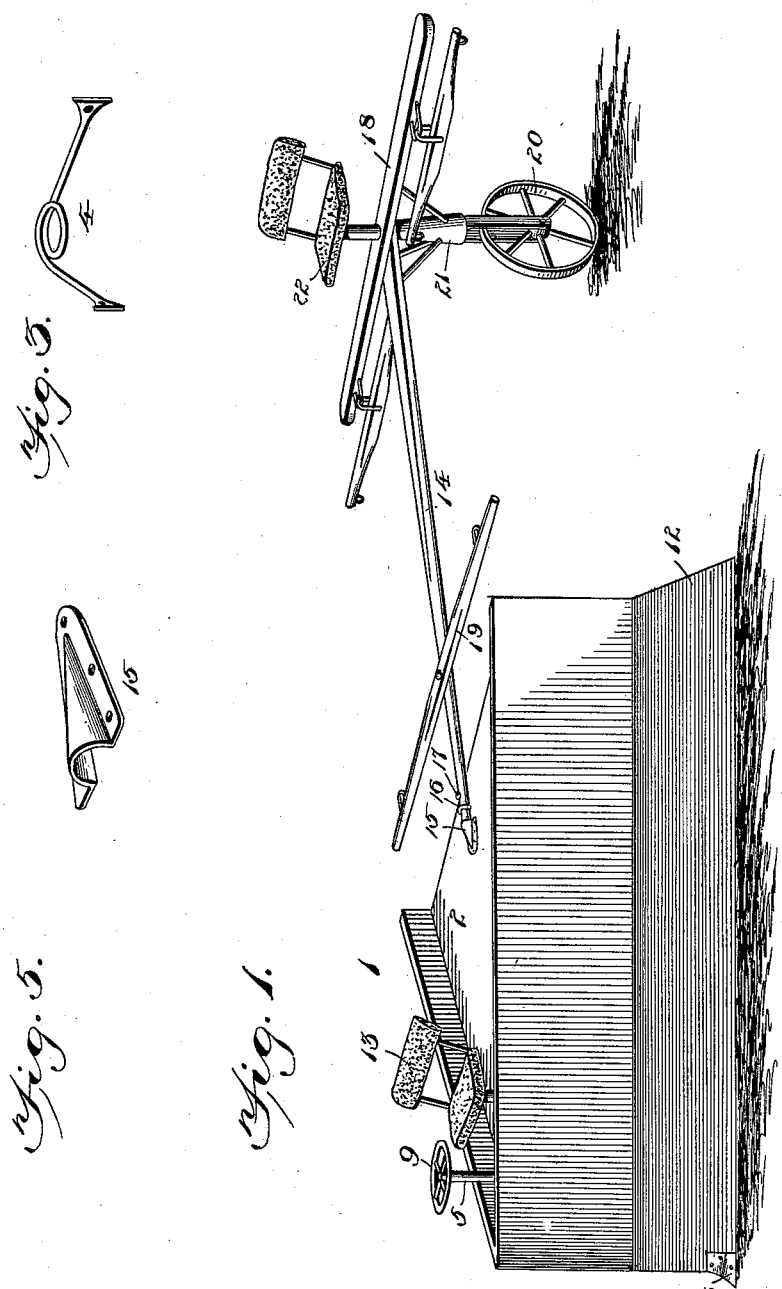
Witnesses
T. L. Mockabee
Victor J. Evans
Inventors
Elwyn P. White and
Thomas Smith,
By John Wedderburn.
Attorney
THE NORRIS PETERS CO., PHOTO-LITHO., WASHINGTON, D. C.

(No Model.) 2 Sheets—Sheet 2.
T. SMITH & E. P. WHITE.
SNOW PLOW.
No. 591,432. Patented Oct. 12, 1897.
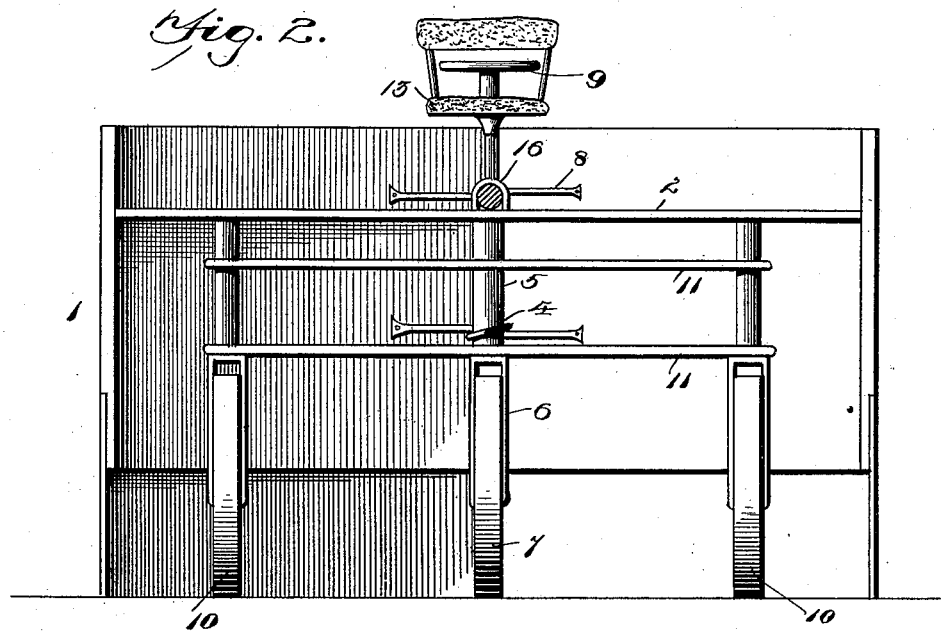
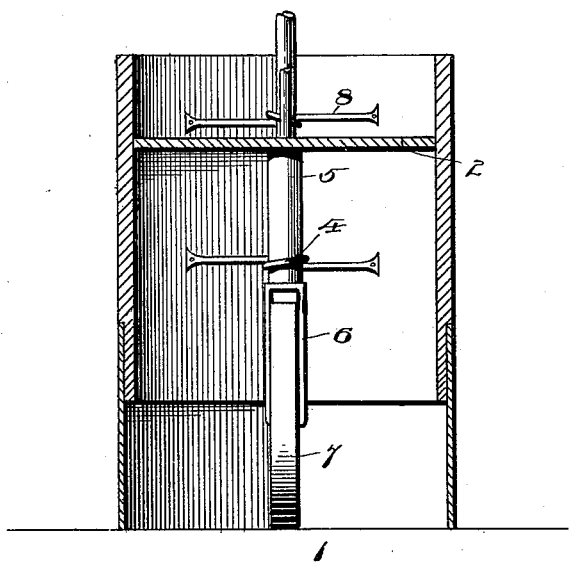
Witnesses
T. L. Mockabee
Victor J. Evans
Inventors
Elwyn P. White and
Thomas Smith
By John Wedderburn.
Attorney

UNITED STATES PATENT OFFICE.

THOMAS SMITH AND ELWYN P. WHITE, OF SOUTHAMPTON, NEW YORK.

SNOW-PLOW.

SPECIFICATION forming part of Letters Patent No. 591,432, dated October 12, 1897.

Application filed April 22, 1897. Serial No. 633,317. (No model.)

*To all whom it may concern:*

Be it known that we, THOMAS SMITH and ELWYN P. WHITE, citizens of the United States, residing at Southampton, in the county of Suffolk and State of New York, have invented certain new and useful Improvements in Snow-Plows; and we do hereby declare the following to be a full, clear, and exact description of the invention, such as will enable others skilled in the art to which it appertains to make and use the same.

The object of this invention is to provide a snow-plow which is strong and durable and can be readily turned or guided.

To these ends the invention consists in supporting the plow upon wheels or rollers, one of which is supported by a rotatable shaft having a hand-wheel, the horses which push the plow being attached to a cross-bar having a supporting-wheel and driver's seat and removably connected to the plow by shafts.

In the following specification we have entered into a detailed description of the invention, reference being had to the accompanying drawings, and to numerals thereon which designate the different parts, and what we consider to be the novel features of construction are specifically set forth in the claims.

In the drawings forming part of this specification, Figure 1 is a perspective view of a snow-plow and means to provide for propelling the same, constructed in accordance with our invention. Fig. 2 is a rear elevation of the plow. Fig. 3 is a detailed view of one of the brackets used for supporting the forward caster-wheel. Fig. 4 is a transverse sectional view through the plow. Fig. 5 is a detailed view of one of the castings or fixtures by which the draft appliance is connected to the plow.

Referring to the drawings by numeral, 1 designates the plow, the diverging sides of which are made up of strong plank and thoroughly braced by cross-pieces and by an upper platform 2, the lower part of the sides being covered with sheet metal, while the forward end is provided with a cast-metal point 3, bolted or otherwise secured thereto. Within the plow at the forward part thereof are metal brackets 4, which are rigidly secured to the sides of the plow and form a lower bearing for the standard or shaft 5 of the stock 6, which supports the caster-wheel 7, the upper part of the shaft or standard 6 passing through the platform 2 and braced within a similar bracket 8, attached thereto, a hand-wheel 9 being secured to the end of the shaft or standard to provide for turning the same. The plow is further supported by caster-wheels 10 10, the stocks or standards of which are rigidly secured to the cross-bars 11 11, extending between the diverging sides or moldboards of the plow. The sheating-metal covering for the moldboards is extended, as shown at 12, to protect the caster-wheels 10, and the sides are extended a short distance above the platform 2. This construction forms a snow-plow which is very strong and durable, and the supporting-wheels are thoroughly protected, the forward wheel, which is located immediately in the rear of the point of the plow, being utilized as the steering-wheel, the steersman being located on the platform upon the seat 13.

In connection with the plow constructed as hereinbefore described we employ certain appliances for utilizing horse-power in pushing the same forward. To these ends one or two shafts 14, according to the number of horses attached, are firmly secured at their forward ends to the rear end of the platform, a casting or castings 15 being attached to the platform and presenting a socket to receive the forward ends of the shaft or shafts. In addition to these sockets hooks 16 are secured to the platform and overlap the shafts, the latter being held in place by removable pins 17. The shaft or shafts are provided near their rear ends with a cross-bar 18, carrying double or single trees, to which the draft-animals are attached, the forward cross-bar 19 being secured to the shafts to form the attachment for the holdback-chains. The rear cross-bar 18, or, rather, the rear end of the draft appliance, is supported by a caster-wheel 20, the shaft or standard 21 of the stock of which passes through a cross-bar and is thoroughly braced thereto and to the shaft or shafts. Upon the cross-bar is mounted a driver's seat 22. The forward part of the shafts or poles are preferably of iron, each having a socket in which the wooden part is fitted, reinforced on top and bottom with heavy iron plates bolted thereto. It is obvious that instead of having a single wheel to support the draft appliance two wheels may be employed.

From the foregoing description, in connection with the accompanying drawings, the construction and operation of the plow will be readily apparent, for the horses or other draft-animals being hitched to the cross-bar 18 or singletrees carried thereby will exert a pushing power upon the plow and walk in the space which is cleared thereby, the steering being accomplished by turning the wheel 7. It will also be noted that the steering of the apparatus is done at the forward end, while the driver is only required to attend to the horses.

Having thus described our invention, what we claim as new, and desire to secure by Letters Patent, is—

1. In a snow-plow, the combination with the plow having supporting-wheels mounted therein, the forward supporting-wheel being connected to a shaft provided with a hand-wheel located above a platform near the upper end of the plow, sockets rigidly secured to the platform, and hooks also secured to the platform in the rear of the sockets, a draft appliance comprising poles or shafts which are passed through the hooks and into engagement with the sockets, a removable pin for holding the poles or shafts into such engagement, and a cross-bar attached to the rear part of the pole or shaft, a caster-wheel supporting the cross-bar and a driver's seat mounted thereon, the parts being constructed and arranged, substantially as shown and for the purpose set forth.

2. In an apparatus of the character described, the combination of a snow-plow having supporting-wheels mounted therein, a vertical shaft supporting the forward wheel and having a hand-wheel at its upper end, the said plow being provided with a platform near its upper end, sockets and hooks rigidly secured to the platform, a pole or poles forming part of the draft appliance and having a cross-bar secured near its rear end, single or double trees connected to the cross-bar, and a supporting wheel or wheels braced to the cross-bar and pole, a driver's seat mounted upon the cross-bar, and a cross-bar located at the forward part of the draft appliance to provide for connecting the holdback-chains thereto, substantially as shown and for the purpose set forth.

In testimony whereof we have signed this specification in the presence of two subscribing witnesses.

THOMAS SMITH.
ELWYN P. WHITE.

Witnesses:
L. E. TERRY,
W. A. CORWITH.